UNITED STATES PATENT OFFICE 2,028,940

ORE EXTRACTION

George James MacKay, Kingston, Ontario, Canada

No Drawing. Application September 24, 1934, Serial No. 745,292. In Canada September 7, 1934

5 Claims. (Cl. 75—18)

This invention relates to ore extraction and particularly to the treatment of precious metal ores or concentrates in which the precious metals are associated with arsenic or sulphur or iron in the form of arseno-pyrite, pyrite, pyrrhotite, marcasite, magnetite or the like.

In many ores of this or similar character the precious metals are in a condition in which they are not available for attack by extraction solutions in standard hydrometallurgical methods. High recovery and efficient extraction of the precious metals, such as gold, silver and the like, is thus difficult or impossible. Even after roasting such ores the extraction of precious metals is frequently quite unsatisfactory.

The object of the present invention is to provide a method of treating such refractory ores so as to prepare them for efficient extraction of the precious metals by any desired hydrometallurgical method. A more specific object of the invention is to break up the ore particle or crystal in such a manner as to make the precious metals available for attack by the extraction solution to be employed.

In accordance with the invention the ore or concentrate is intimately mixed with a carbonate or nitrate of sodium or potassium and the mixture is heated to temperatures of 950° and 1250° F. and below that of fusion. Air may be present during the heating but it is usually preferable to heat in the absence of oxygen. During this treatment sodium polysulphides are formed by removal of one atom of sulphur from the $FeS_2$ and sodium sulph-arsenate is formed by action on the arseno-pyrite particles or crystals. This leaves the refractory particles in a broken up or altered condition in which the extraction solution may attack and dissolve the precious metals. The heated mixture is then quenched in water to further disintegrate the ore particles, making the precious metals still more amenable to attack by the cyanide or other extraction solution to be employed.

In the quenching solution the precious metal, as gold, reacts with the sodium polysulphides and/or the sodium sulph-arsenate, formed in the heating stage, forming compounds such as $NaAuS_2$ and $AuAsS_1$ which are soluble in water. Thus a large part of the gold may be found in this solution and may be recovered directly therefrom by precipitation.

The objectionable arsenical compounds are thus removed from the ore and in the transformed ore particles or crystals the precious metals are in a condition readily amenable to standard cyanide or other treatment. After quenching, the ore pulp is treated with lime and filtered and the altered ore or concentrate is subjected to cyanide or other similar treatment for the extraction of the precious metals therein.

It will thus be observed that applicant subjects refractory precious metal ores, or concentrates thereof, to a preliminary treatment which destroys the refractory character of the ore and efficiently releases the precious metals for solution in cyanide or the like, thus greatly increasing the percentage recovery of the desired metals. A large part of the arsenic and some of the sulphur in the ore or concentrate are caused to react with the added sodium or potassium compound and the compounds so formed unite with the precious metals forming water soluble salts thereof. The rupture and partial disintegration of the ore particles exposes the gold or silver to more effective solution.

While the process described is particularly applicable to ores of the character described, it may be beneficially applied to refractory ores in which gold and silver are so closely associated or enclosed in gangue materials, such as silica, calcite and the like, that the extraction solutions cannot penetrate the ore particles to dissolve the precious metals. The bicarbonates of sodium and potassium may be used.

As illustrative of the effectiveness of the method the following specific example is given:

A concentrate having an assay value of 2.5 ounces of gold per ton and containing 38% iron, 40% sulphur, 5½% arsenic and 12% insoluble, treated in accordance with the process with sodium carbonate equivalent in weight to about 10% of the concentrate, gave a gold recovery of 98.4%. The same product subjected to cyanide treatment, without the pretreatment, gave a gold recovery of only 75%. Roasting the product, under most favourable conditions, prior to cyanidation, gave a recovery of 90%.

I claim:

1. A method of treating ore or concentrates thereof for the recovery of precious metals, which comprises mixing the ore with a salt of a group consisting of carbonate or nitrate of sodium or potassium, heating the mixture under non-roasting conditions to 950° to 1250° F. and disintegrating the heated mixture in water to dissolve the soluble products so formed.

2. In the recovery of precious metals from refractory ores, the method which comprises heating the ore under non-roasting conditions to a temperature between 950° and 1250° F. and without fusion in the presence of a salt of a group consisting of carbonate or nitrate of sodium or potassium, treating the heated mixture with water to disintegrate the particles and to form soluble salts of at least a portion of the precious metals and thereafter subjecting the residue to further treatment to remove the rest of the precious metals.

3. In the recovery of precious metals from refractory ores containing sulphur and arsenic, the method which comprises heating the ore to a temperature in excess of 950° F. under non-roasting conditions with an alkali metal compound to form soluble compounds of sulphur and arsenic, treating the resulting hot product with water to form soluble salts of the precious metals, treating the pulp with lime and after filtering subjecting the residue to the action of cyanide.

4. In the recovery of precious metals from refractory ores containing sulphur and arsenic, the method which comprises breaking up the ore particle with heat under non-roasting and non-fusing conditions at a temperature between 950 and 1250° F. in the presence of an alkali metal salt to form soluble compounds of sulphur and arsenic and thereafter quenching the heated product with water to further release the precious metal and form soluble salts thereof.

5. A method of releasing precious metals from their intimate structure in refractory ores containing sulphur, arsenic and the like which comprises heating the ore under non-roasting conditions at a temperature in excess of 950° F. in the presence of sodium carbonate and treating the resulting hot product with water to form soluble salts of the precious metals.

GEORGE JAMES MacKAY.